(12) United States Patent  
Ohashi et al.

(10) Patent No.: US 7,723,619 B2
(45) Date of Patent: May 25, 2010

(54) COMPOSITE MOLDINGS AND A METHOD OF MANUFACTURING THE SAME

(75) Inventors: Katsuhide Ohashi, Mito (JP); Shigeo Amagi, Tokai (JP); Osamu Miyo, Hitachi (JP); Sadayuki Aoki, Takahagi (JP)

(73) Assignee: Hitachi, Ltd., Tokyo (JP)

( * ) Notice: Subject to any disclaimer, the term of this patent is extended or adjusted under 35 U.S.C. 154(b) by 699 days.

(21) Appl. No.: 10/589,883

(22) PCT Filed: Mar. 19, 2004

(86) PCT No.: PCT/JP2004/003764

§ 371 (c)(1),
(2), (4) Date: Aug. 18, 2006

(87) PCT Pub. No.: WO2005/091441

PCT Pub. Date: Sep. 29, 2005

(65) Prior Publication Data

US 2007/0167047 A1    Jul. 19, 2007

(51) Int. Cl.
    *H05K 1/16* (2006.01)
(52) U.S. Cl. .................... 174/260; 439/736
(58) Field of Classification Search ............ 439/736, 439/164, 76.1; 174/260
    See application file for complete search history.

(56) References Cited

U.S. PATENT DOCUMENTS 6,068,523 A * 5/2000 Takahashi .............. 439/736
6,132,251 A    10/2000 Onoda
6,152,761 A *  11/2000 Wellinsky et al. ......... 439/456
6,187,242 B1 * 2/2001 Onoda .................... 264/255
6,482,036 B1   11/2002 Broussard
6,780,067 B1   8/2004 Kono et al.
7,192,317 B2 * 3/2007 Nakagawa et al. ......... 439/736

FOREIGN PATENT DOCUMENTS

| JP | 8-250189 A | 9/1996 |
| JP | 11-31572 A | 2/1999 |
| JP | 2000-30798 A | 1/2000 |
| JP | 2000-326359 A | 11/2000 |
| WO | WO 98/40938 A1 | 9/1998 |

OTHER PUBLICATIONS

International Search Report dated Jun. 1, 2004 (four (4) pages).
Japanese Office Action including English translation dated Jan. 6, 2009 (Six (6) pages).
Chinese Office Action including English translation dated Jul. 25, 2008 (Fourteen (14) pages).
European Search Report dated Feb. 21, 2008 (three (3) pages).

* cited by examiner

*Primary Examiner*—Hung S Bui
*Assistant Examiner*—Andargie M Aychillhum
(74) *Attorney, Agent, or Firm*—Crowell & Moring, LLP

(57) ABSTRACT

Continuous annular resin bands surrounding electrical contact portions of respective terminals are disposed without gaps between the electrical contact portions of respective terminals and resin members that fixedly hold the terminals; there are formed gaps among the adjoining resin bands. Gaps are formed among a bundle of terminals having annular resin bands and resin members surrounding the bundle. A partial adhesion is formed at the interface between the terminals and the resin by a low cost manufacturing method, whereby a molding with high air-tightness between the interior and exterior thereof and high reliability is realized.

9 Claims, 10 Drawing Sheets

B2-B2

B2'-B2'

COMPOSITE MOLDINGS AND A METHOD OF MANUFACTURING THE SAME

TECHNICAL FIELD

The present invention relates to composite moldings molded by insert-molding terminals with resin and a method of manufacturing the same.

BACKGROUND ART

In terminal components formed by insert-molding plural metal terminals for electrical connection with resin, the resin shrinks between the terminals at the time of molding, but shrinkage of the resin is different in directions, and there are formed partial gaps of several micrometers at the interface between the terminals and the resin due to difference in shrinkage among the resin around the terminals. As a countermeasure to this problem, there is a method wherein the terminals and the resin are integrated by bonding them with cured epoxy resins, etc after the insert molding.

Further, there is another method wherein the surfaces of the terminals, which are in contact with the resin, are worked to be rough surfaces, thereby to increase a contact area between the terminals and the resin at the rough surfaces after working.

In Japanese patent laid-open publication 2000-326359, metal terminals are pre-molded with resin, and the pre-molded molding is used as an insert and molded with another resin to integrate it with a double-layered resin.

The terminal components, wherein the plural terminals are insert molded with resin, have problems in productivity, cost and reliability. In the integrating method wherein the terminals and resin are bonded with the an adhesive such as epoxy resin after insert molding, for example, a step of coating the epoxy resin and a step of curing the epoxy resin after the coating step are required; a curing time of 30 to 40 minutes is needed for the curing step. In this method, facilities such as coating machines, curing ovens, etc are necessary, which has low productivity and increases production cost.

In the method wherein the surfaces of the metal terminals and the resin being in contact with each other are worked to make the surfaces rough to increase an area of the contact faces and improve air-tightness between them, it was difficult to prevent formation of gaps at the interface between the circumference of the terminals and the resin in molding, since shrinking directions of the resin and amounts of shrinkage are inhomogeneous in any directions.

In the method wherein the metal terminals are pre-molded with resin, followed by molding the pre-molding as an insert with the resin, there are formed gaps at the interfaces between the circumference of the terminals and the resin, since the resin present among the terminals shrinks inhomogeneously in shrinking directions and shrinking amounts in molding are not homogeneous in directions.

In order to solve the above mentioned problems, the present invention provides composite moldings or moldings having insert members with air-tightness between the interior and exterior of the moldings and a method for manufacturing the same, wherein partial adhesion at the interface between the terminals and the resin is formed, without limitation by the number of the terminals and arrangement thereof.

DESCRIPTION OF THE INVENTION

In order to solve the above-mentioned problems, the present invention is featured by providing resin bands for surrounding a circumference of a terminal component between an electrical contact portion of the terminal component formed by molding terminals for electrical connection with exterior with resin and a resin member for fixedly holding the terminal component, wherein there are gaps among adjoining resin bands.

The molding body of the present invention realizes insert-built-in moldings with high reliability and high air-tightness between the interior of the molding and the exterior thereof by forming partial adhesion at an interface between the circumference of the terminals and the resin shrinking at the time of molding.

PREFERRED EMBODIMENTS FOR PRACTICING THE PRESENT INVENTION

Prior to the detailed explanation of the present invention, problems to be solved by the present invention will be described in the following.

Figure 19:
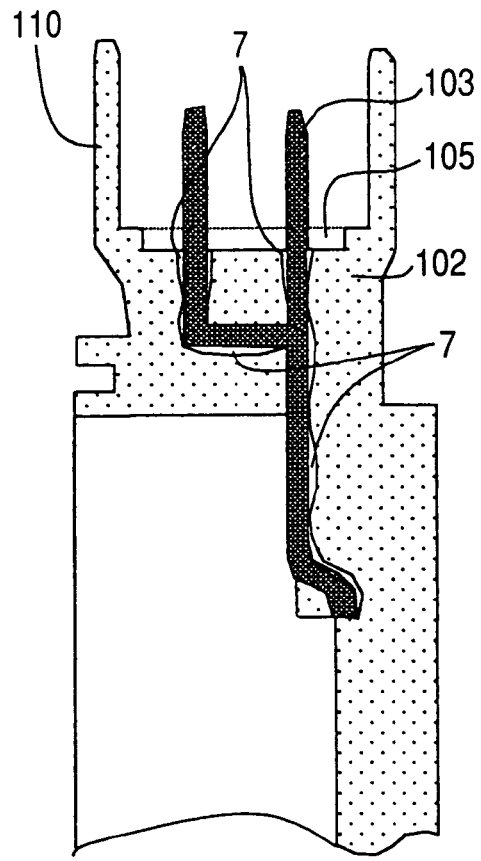
FIG. 19 is a partial cross sectional view of a neighborhood of an insert member in the composite molding with an inserted member in a direction B2-B2, which corresponds to A1-A1 of the composite molding in FIG. 1.
Figure 20:
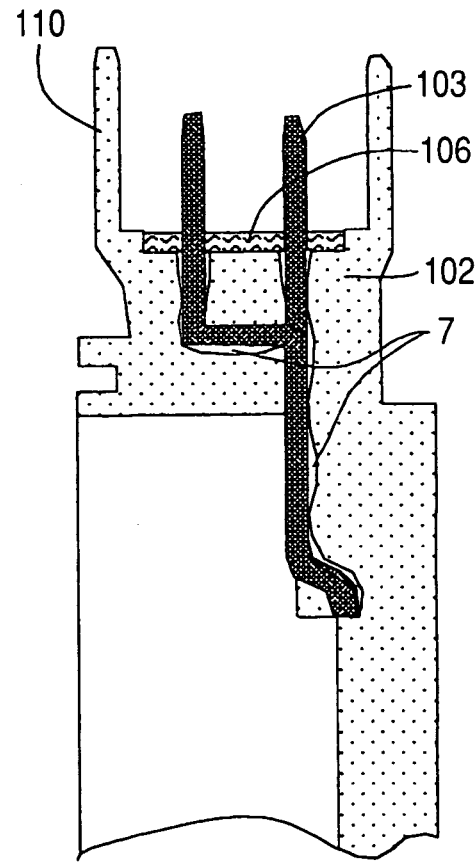
FIG. 20 is a partial cross sectional view of a neighborhood of an insert member in the composite molding with the inserted member after an epoxy resin is cured in a direction B1'-B1', which corresponds to A1-A1 of the composite molding in FIG. 1.

In the composite molding 110 shown in FIG. 19, plural metal inserts 103 are insert-molded with resin 102, the gaps 7 being formed at the time of molding. Thus, an epoxy resin 106 as an adhesive is coated in a recess 105 between the terminals 103 and the resin fixedly holding the terminals 103. The insert-molded body coated with the epoxy resin is subjected to heating thereby to cure the epoxy resin. The epoxy resin 106 strongly bonds the metal terminals 103 and the resin 102 in the neighborhood of the metal terminals 103, thereby integrating them as shown in FIG. 20.

However, the above method requires a step of coating the epoxy resin 106 and a step of curing the coated epoxy resin 106 that needs 30 to 40 minutes. Further, installments such as a coating machine and a curing oven are necessary, which lower the productivity and increase a production cost.

Figure 17:
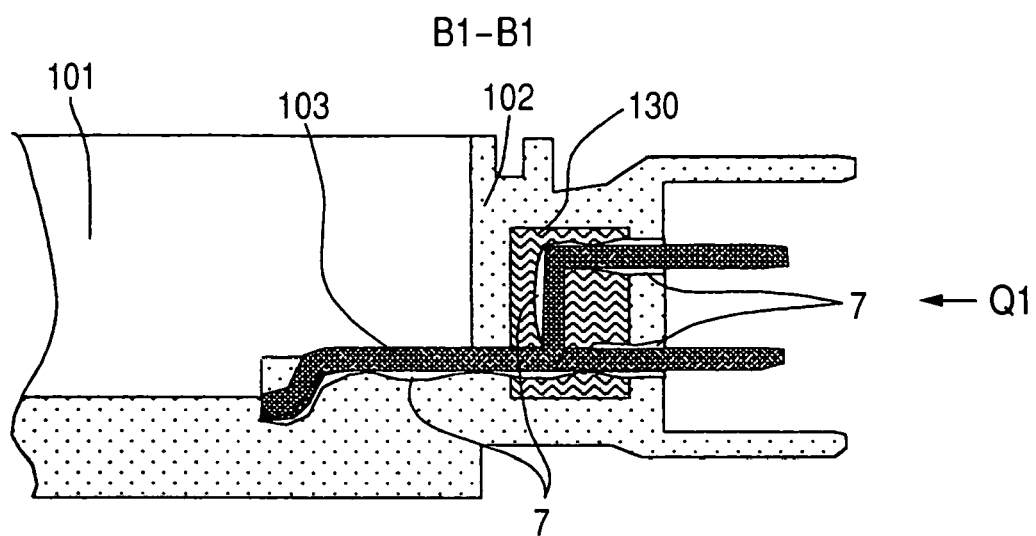
FIG. 17 is a partial cross sectional view of a neighborhood of an insert in the comparative composite molding employing a pre-molding with an inserted member in a direction B1-B1, which corresponds to A1-A1 of the composite molding in FIG. 1.
Figure 18:
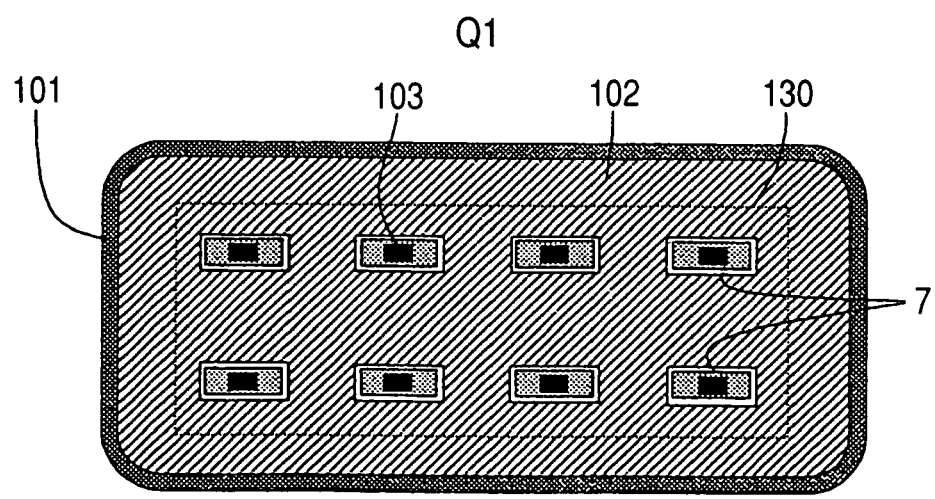
FIG. 18 is a partial frontal view Q1 of a neighborhood of an insert member in the comparative composite molding employing the pre-molding for showing resin shrinkage at the time of molding.

On the other hand, in the structures of composite moldings 101, shown in FIGS. 17 and 18, that employ pre-moldings, resin 130 is pre-molded after the metal terminals 103 in a mold for pre-molding, and then the pre-molding is inserted into a mold for molding and molded with resin. However, since the metal terminals 103 are pre-molded with resin 130 in a bundle, the resin 130 present between the terminals generates inhomogeneous shrinkage in directions and of shrinkage amount at the time of molding, which leads to gaps at an interface between the terminals 103 and the resin 130.

Further, in the case of the resin 102 present between the terminals 103 wherein the pre-molding is inserted as an insert member, there are formed gaps 7 at the interface between the resin 102 and the terminals 103 because of inhomogeneity of the shrinkage in directions and of shrinkage amount at the time of molding.

As having been discussed, the conventional methods of molding are hard to prevent formation of gaps.

The present invention is featured in that in the insert molded terminal component with resin, continuous annular resin bands each of which surrounds each of the terminals and there are formed gaps among the adjoining resin bands.

Another feature is that there are gaps among resin that surrounds each of bundles of the terminals each of the terminals is surrounded by a continuous ring-form resin band.

Further, there is another feature that a lib is formed between ring-form resin bands and resin member for fixedly holding the terminals, in addition to the gaps among the resin member surrounding the bundles of terminals each of the terminals is provided with ring-form resin bands.

In order to unify the terminals in advance, the terminals are pre-molded with a resin such as a resin having a low softening point, soft materials, resins having solubility with other resins or mixtures thereof.

The pre-molded terminals can be pre-molded with a resin to form continuous ring-form resin bands that surround each of the terminals and the pre-molded continuous resin bands are molded with resin to form double-layered resin bands.

The resins for pre-molding may be the same, or the resins do not contain filler. Polyester group elastmers are used as a pre-molding resin.

Sectional configurations of terminals and the resin bands may be the same as rectangular or columnar.

Embodiments of the present invention will be explained by reference to drawings. The present invention is not limited to the following embodiments.

Embodiment 1

Figure 1:
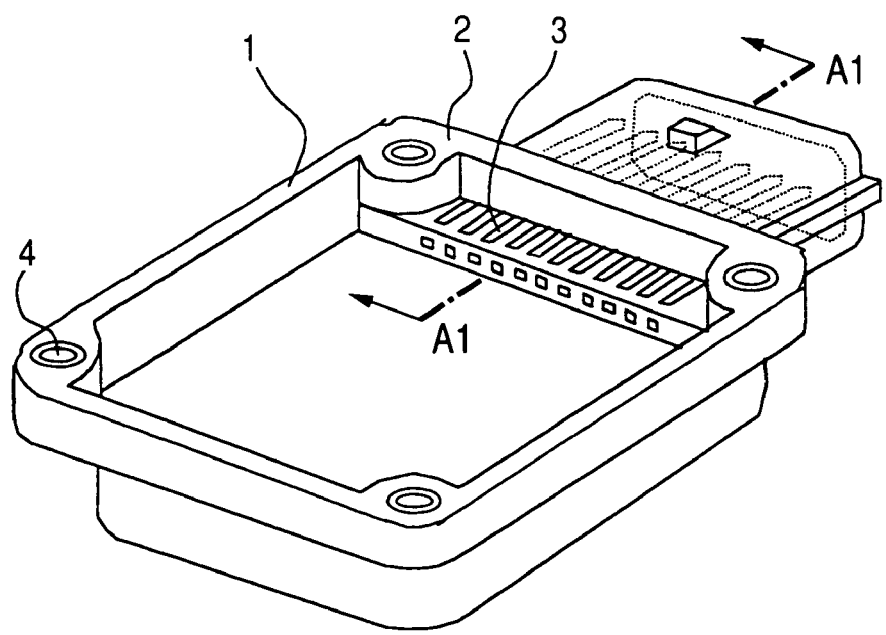
FIG. 1 is a perspective view of a composite molding with an inserted member according to a first embodiment of the present invention.
Figure 2:
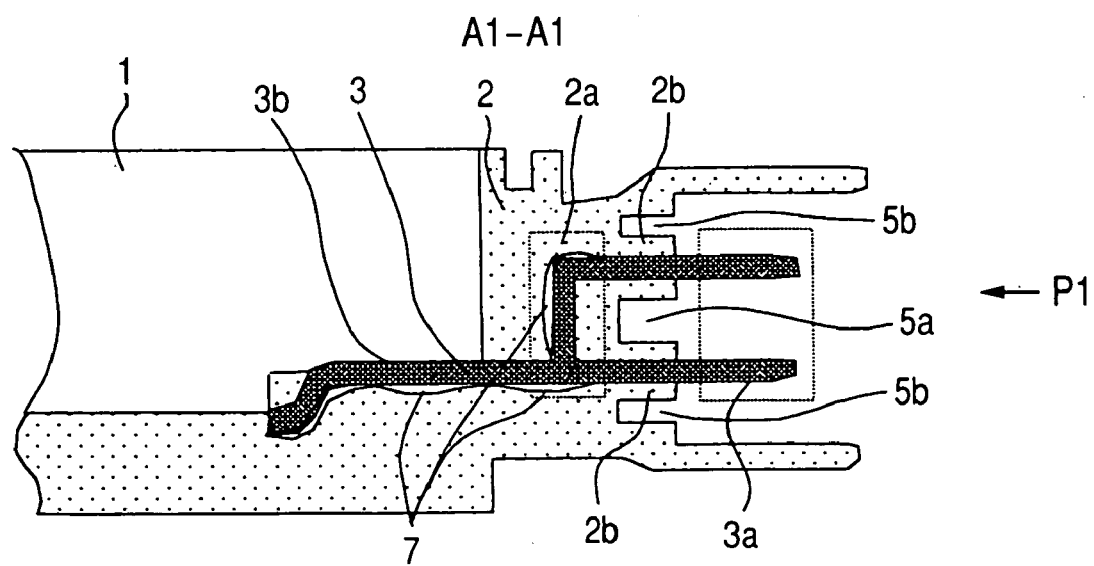
FIG. 2 is a partial cross sectional view of a neighborhood of the inserted member in the composite molding with of the first embodiment of the present invention.
Figure 3:
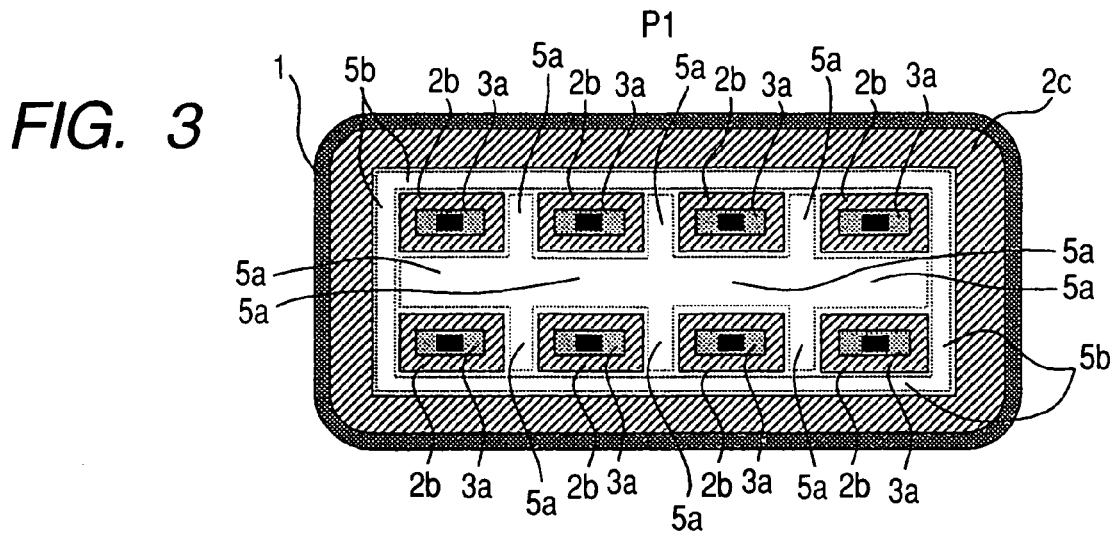
FIG. 3 is a partial frontal cross sectional view of a neighborhood of the inserted member in the composite molding along an arrow P1 in FIG. 2.

FIG. 1 is a perspective view of a composite molding 1 as a first embodiment of a molding with an insert. In the composite molding 1, metal terminals 3 made of copper having 0.6 to 1.0 mm thick and 2 to 3 mm wide and bushings 4 for fixing are inserted into resin 2. FIG. 2 is a cross sectional view of an enlarged portion of the metal terminals 3 of FIG. 1 along A1-A1 line in FIG. 1. FIG. 3 is a cross sectional view of an external contact portion 3a of the molding 1 along P1 in FIG. 2. The metal terminals 3 comprise electrical contact portions 3a for electrically connection with exterior and electrical connecting portions 3b for electrically connecting with circuit boards that are mounted on the molding 1, later.

The electrical contacting portions 3a and the electrical connecting portions 3b are covered with resin 2a for fixedly holding the metal terminals. Outer bands of the metal terminals 3 are formed with ring-form continuous resins 2b having a thickness of 1 to 1.5 mm and a length of 3 to 5 mm without gaps therebetween. At the same time, gaps 5a having a width of 1 to 3 mm and a depth of 3 to 5 mm were formed among the adjoining resin bands 2b.

Further, a gap 5b having a width of 1 to 3 mm and a depth of 3 to 5 mm was formed between the bundle of the metal terminals 3 and resin 2c. Resin materials for the insert resin molding include thermoplastic high polymer materials such as polybutylene terephthalate resin (PBT resin), polyphenyrene sulfide resin (PPS resin), polyamide resin (PA resin), polypropyrene resin (PP resin), polyacetal resin (POM resin), polystyrene resin (PS resin), acrylonitrile-butadiene-styrene resin (ABS resin), etc, thermosetting resins such as epoxy resins, phenol resins, etc, resin materials containing inorganic materials such as glass fibers, organic materials such as carbon fibers, metals.

In the following, a resin material comprises polybutadiene terephthalate resin and glass fiber in an amount of 40% by weight.

As the structure of the composite molding was explained, a method of manufacturing the same is explained in the following.

Although not shown in the drawing, plural metal terminals 3 were inserted into a mold heated at a temperature of 40 to 100 degrees Celsius, and the metal terminals 3 were fixed by a cramp comprising a movable mold, fixed mold and a slide coma.

Using an injection molding machine, resin 2 for molding, which gas been melted at a heater temperature of 220 to 270 degrees Celsius was filled into a hollow cavity for molding the composite molding 1 through a nozzle, a runner and a gate in the mold. Upon filling of the resin, the melted resin was rapidly cooled in the mold to solidify, and then the composite molding 1 was pushed out from the mold by a pin after the mold was opened and closed.

In general, the melted resin having a smallest thickness cools and solidifies at first, and part having a thickest portion cools and solidifies at last. The melted resin generates shrinkage in the direction of the center of the thickness of the resin (this is called as a cooling center) in a volume rate of about 0.2 to 0.8% as a whole. In composite moldings having insert members therein, it is difficult to make constant a thickness of resin, and thus it is difficult to make shrinkage homogenous in any directions and shrinkage amount controlled.

In the resin and the metal terminals of copper of the composite molding, there is difference in linear thermal expansion coefficients. Accordingly, after the molding was separated from the mold, there are warping and gaps at the interface between the inserted members and the surrounding resin. Thus, products that need air-tightness must be subjected to airtight sealing treatment as a post treatment.

Figure 4:
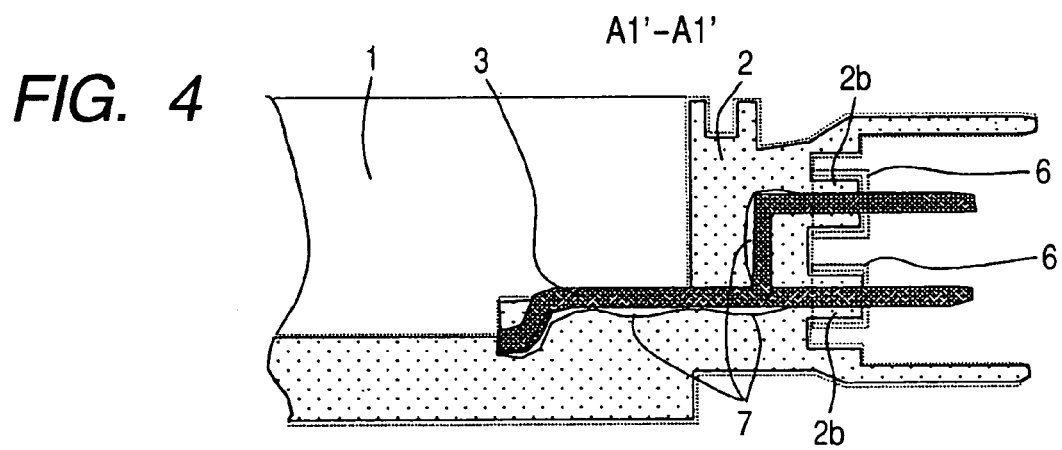
FIG. 4 is a partial cross sectional view of the first embodiment for showing shrinkage of resin in the neighborhood of the insert member at the time of molding.
Figure 5:
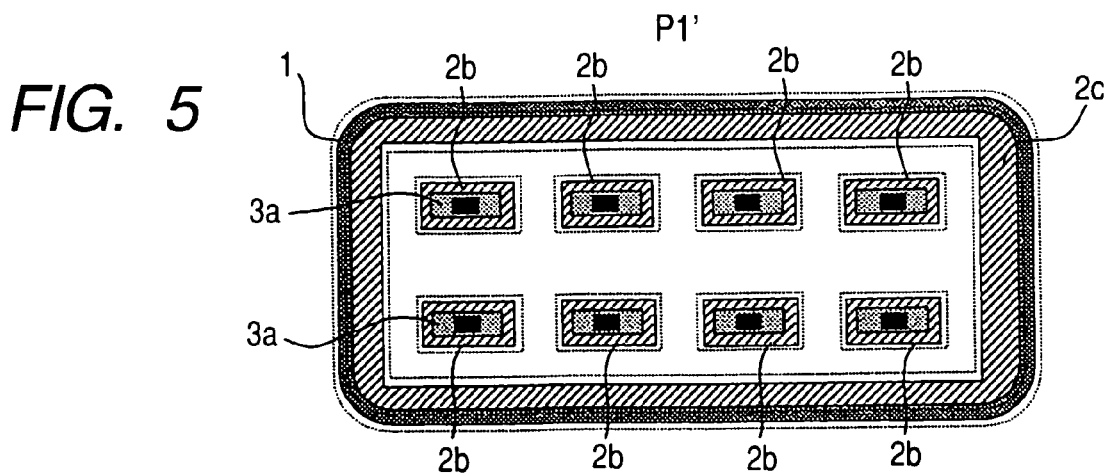
FIG. 5 is a partial frontal cross sectional view of the neighborhood of the first embodiment for showing shrinkage of resin at the time of molding.

In the present embodiment, each of the metal terminals 3 was surrounded by a continuous ring-form resin band 2b without gaps. At the same time, gaps 5a were formed among the adjoining resin bands 2b and a gap 5b was formed a plurality of bundles of metal terminals 3 and the resin 2c that surrounds the bundles. As shown in FIG. 3 in more detail, each of the resin bands of ring-form with a constant thickness covers each of the metal terminals 3 are independent from each other. As a result, as shown in FIGS. 4 and 5, the resin bands have the same shrinkage in thickness, homogeneously.

By virtue of gaps 5a formed among the adjoining resin bands 2b and gaps 5b formed between the bundles of metal terminals and resin 2c surrounding the bundles, a tension force between the resin bands 2b, which is caused by shrinking of the resin bands does not occur. Accordingly, the respective resin bands 2b tighten the metal terminals 3 as a concentric center. As a result, gaps at the interface between the resin bands surrounding the metal terminals in the form of ring and the metal terminals are not formed or hard to be formed. At the same time, closely bonded adhesion portions 6 are formed.

Since the adhesion portions 6 of the resin bands can keep air-tightness to maintain the air-tightness between the interior portion of the molding and the exterior, even when gaps 7 occur at positions other than the interface between the metal terminals 3 and the resin 2.

In the terminal components by insert-molding of electrical terminals with resin using this method, the resin bands 2b surrounding the metal terminals, gaps 5a among the adjoining resin bands 2b and gaps 5b among the resin 2c surrounding the bundles of metal terminals are easily formed by a mold. Further, according to this structure, it is possible to increase reliability to air-tightness and anti-water. Furthermore, a post processing for airtight-sealing that needs a long time process after molding is not necessary, which provides composite moldings at low prices?

Embodiment 2

Figure 6:
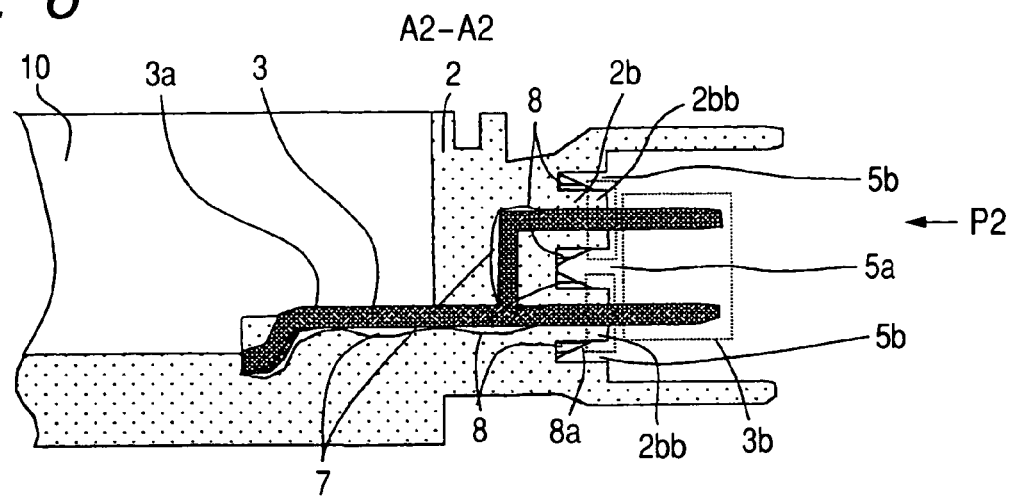
FIG. 6 is a partial cross sectional view of a neighborhood of an insert member in a composite molding with an inserted member according to a second embodiment of the present invention.
Figure 7:
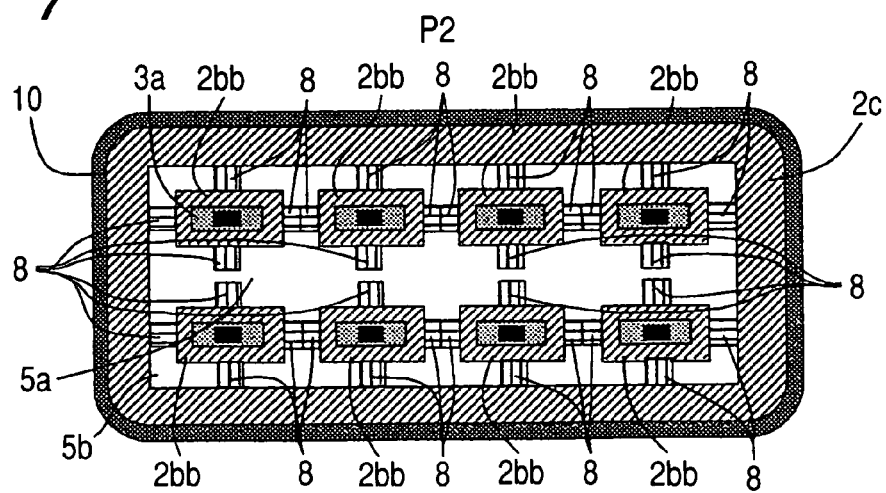
FIG. 7 is a partial frontal cross sectional view of the composite molding of the second embodiment with the inserted member.
Figure 8:
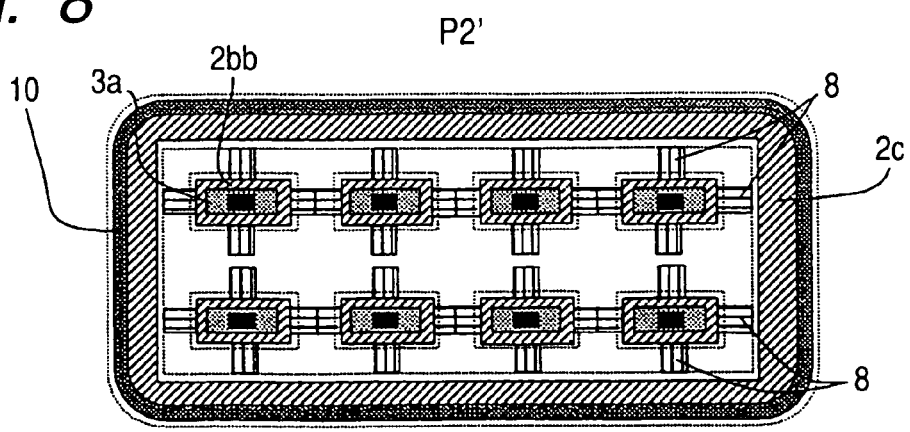
FIG. 8 is a partial cross sectional view of a neighborhood of an insert member in composite molding of the second embodiment for showing shrinkage of resin in molding.

As a second embodiment of a molding with an insert of the present invention, FIG. 6 shows an enlarged view of a portion around the metal terminals 3 of the composite molding 10, and FIG. 7 shows a view of an outer contact portion 3a of the molding 10 from an angle P2. FIG. 8 is a modification of FIG. 7. The metal terminals 3 to be inserted have electrical contact portions 3a and electrical connections 3b, as the same as the first embodiment, and portions between the electrical contact portions 3a and the electrical connections 3b are molded with resin 2a to fasten the metal terminals.

Each of the metal terminals 3 is surrounded by a continuous annular resin band 2b having a thickness of 1 to 1.5 mm and a height of 8 to 10 mm between the electrical contact portions 3a and the resin 2 fixing the metal terminals 3. At the same time, gaps 5a having a recess width of 1 to 3 mm and a recess depth of 8 to 10 mm are formed between the adjoining resin bands 2b. Bundles of the metal terminals 3 having the resin band 2b and gaps 5b were formed wherein the gaps 5b have a recess width of 1 to 3 mm and a recess depth of 8 to 10 mm. Especially, ribs 8, having the same structure and being flared towards the resin 2, having a width of 1 to 1.5 mm and a height of 4 to 5 mm were formed between roots of the resin bands 2b and the resin 2a at 4 points that are located outside of the resin bands 2b.

Further, resin bands 2bb, being not rib form and having a height of 4 to 5 mm, were formed between the electrical contact portions 3a and the ribs 8. The respective portions were molded with a mold.

In the method shown in FIG. 6, a material comprising polybutylene terephthalate resin containing glass fiber of 40% by weight was used wherein plural metal terminals were placed at predetermined positions in an injection mold heated to 40 to 100 degrees Celsius, and the molten resin was filled into cavity of the mold. Upon filling, the composite molding 10 was picked out after the resin was cooled.

The ribs 8 having the width of 1 to 1.5 mm and the height of 4 to 5 mm is a reinforcing member that prevents falling down of the resin band 2b towards the resin 2a. Since the ribs 8 are located uniformly around the resin bands 2b, the resin bands 2b shrink, with well balance, around the metal terminals 3 in the center. Accordingly, the distance between the resin bands 2b can be set with high precision. The distance between the metal terminals 3 can be set with high precision, too.

Since the portions where the ribs 8 and the resin bands 2b are in contact are formed of the same resin without gaps, the cooling center may move from the center of the metal terminals 3 to outside thereof, as the size of the ribs becomes larger; the shrinkage direction of the resin bands 2b changes towards outside, which may lead to gaps at the interface between the metal terminals 3 and the resin bands 2b al last. By disposing the ribs 8 and resin bands 2bb having a height of 4 to 5 mm, which are not rib form, between the electrical contact portions 3a and the ribs 8, the resin bands 2bb fasten the metal terminals 3 as does the resin bands 2b in the first embodiment, as a result, the structure may prevents formation of gaps at the interface between the resin bands 2b that surround the metal terminals and the metal terminals that are in contact with the resin bands 2bb. At the same time, the close adhesion is obtained, as in the first embodiment.

Embodiment 3

Figure 9:
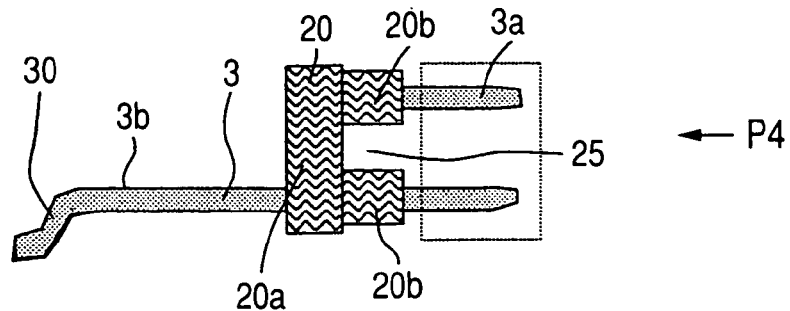
FIG. 9 is a side view of a pre-molding according to a third embodiment of the present invention.
Figure 10:
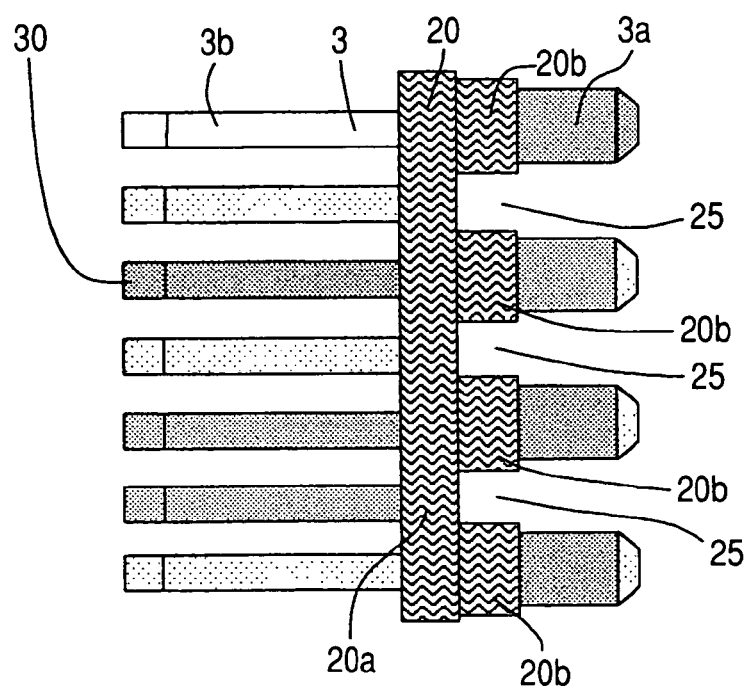
FIG. 10 is a top view of the pre-molding according to the third embodiment of the present invention.
Figure 11:
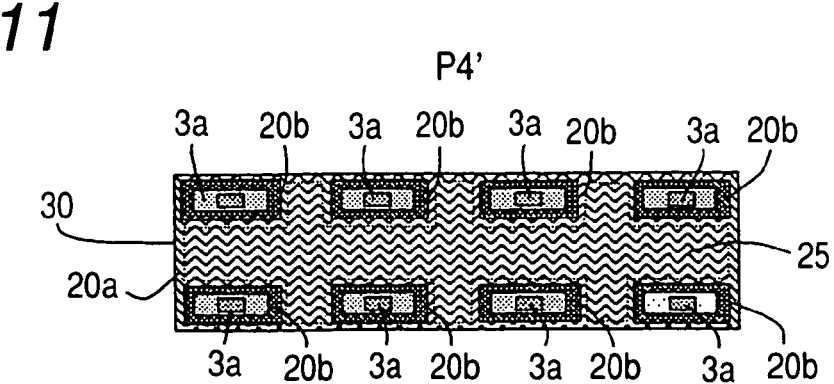
FIG. 11 is a frontal view of the pre-molding according to the third embodiment of the present invention.
Figure 12:
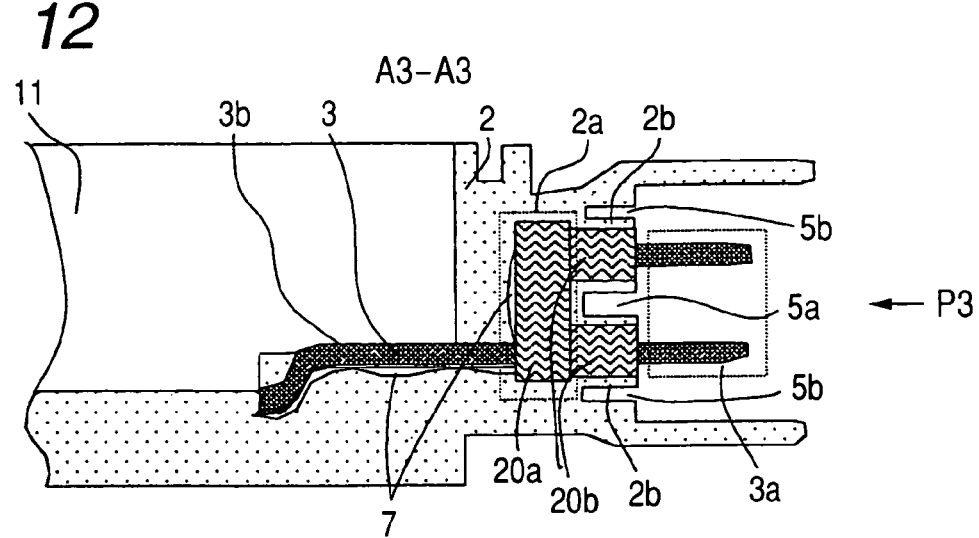
FIG. 12 is a partial cross sectional view of a neighborhood of an insert in the composite molding of the third embodiment for showing resin shrinkage at the time of molding.
Figure 13:
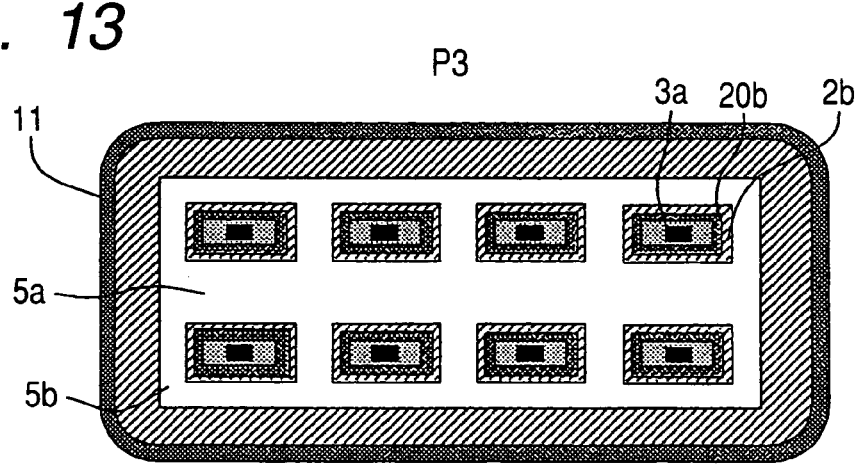
FIG. 13 is a partial frontal cross sectional view of a neighborhood of an insert member in the composite molding of the third embodiment of the present invention.
Figure 14:
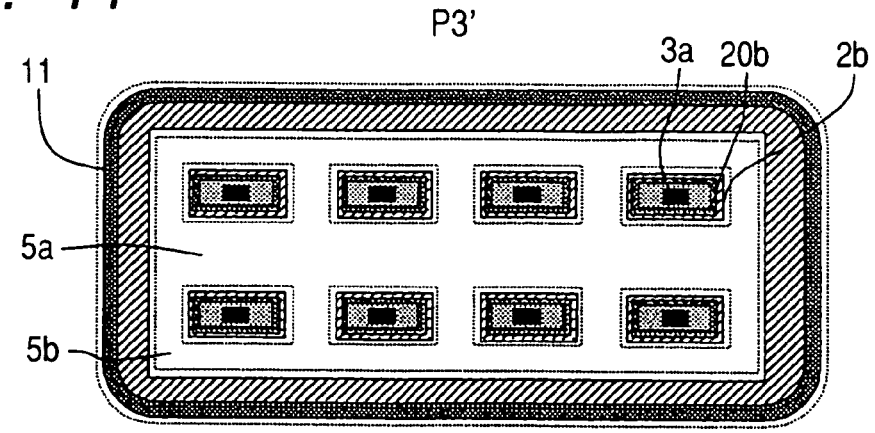
FIG. 14 is a partial frontal cross sectional view of a shrinking state of a neighborhood of an insert member in the composite molding of the third embodiment along an arrow P3'.

As the third embodiment, an enlarged sectional view of the metal terminals and its neighborhood of a composite molding 11 is shown in FIG. 12. FIG. 13 is a cross sectional view of the molding 11 viewed from the outer contact portions FIG. 14 shows a shrinking state of the neighborhood of the insert member 20b in the composite molding 11. The metal terminals to be inserted have the electrical contact portions 3a and electrical connections 3b as the same as the first embodiment; in this embodiment, pre-moldings 30 which is shown in FIGS. 9-11 were prepared as shown in FIGS. 9 to 11, wherein parts of the respective outers of the metal terminals 3 covered by resin 2 is made of resins 20 having a low softening point, soft materials, soluble materials or combinations thereof so as to couple the metal terminals with each other. The pre-moldings 30 have the resins 20a for coupling the metal terminals 3, wherein the continuous annular resin bands 20b having a annular thickness of 0.5 to 1.0 mm and a annular height of 3 to 5 mm were formed around the metal terminals 3 without gaps and between the electrical connections 3b of the respective metal terminals 3 and the resin 20a for coupling the metal terminals. Further, gaps 25 were formed among the resin bands 20b.

As an insert member, the pre-molding 30 was insert-molded to produce a double layered resin band surrounding the resin bands 20b, the double layered resin being free from gaps and having an annular thickness of 0.5 to 1.0 mm and an annular height of 3 to 5 mm.

In the third embodiment, the resin used was polybutylene terephthalate resin containing glass fiber of 20% by weight, and plural metal terminals were placed in a mold heated to a temperature of 40 to 100 degrees Celsius into which the resin was filled by an injection mold method. Upon the filling of the resin, the pre-molding 30 which is shown in FIGS. 9-11 was taken out from the metal mold after cooling and solidification of the resin. Then, the pre-moldings 30 were inserted into predetermined positions of a metal mold heated to 40 to 100 degrees Celsius and a resin comprising polybutylene terephthalate resin containing glass fiber of 40% by weight was filled in the mold by an injection molding method. As the same as the pre-moldings, composite moldings 11 were taken out from the metal mold after the resin was cooled and solidified.

The metal terminals 3 tend to be bent or deformed at the time of plating of handling after press-forming. Further, when the number of metal terminals is large, inserting them takes a long time and a molding cycle time becomes longer so that productivity becomes worse. Accordingly, in the third embodiment, connecting members for connecting tips of one side or both sides of the metal terminals 3 were disposed, though not shown in the drawing, were disposed in advance; after the metal terminals 3 were fitted by the pre-moldings 20, the connecting members were removed. As a result, the bent and deformation of the metal terminals during plating step or handling were prevented; thus, considerable shortening of setting time for inserting the pre-moldings in the metal mold could be achieved and productivity was improved.

The resin bands 20b that surround continuously the circumference of the metal terminals 3 and the gaps 25 among the adjoining resin bands 20b fasten the respective metal terminals 3 in the center thereof.

Further, the continuous annular resin bands 2b surround the resin bands 20b to constitute a gapless double-layered resin band layer thereby fastening the resin bands 20b. Since the resin bands 20 have solubility with the resin 2, a thin film of the resin 2 covers the resin 20 by melting heat of the resin 2. As a result, the interface between the circumference of the resin bands 20b and the resin bands 2b and the interface between the metal terminals and the resin bands 20b surrounding the terminals are air-tightly adhered. Accordingly, when the pre-molding is used to form a double layered layer of gap-less continuous annular resin bands 20b and resin bands 2b, the air-tightness of the adhesion 6 was the same as in the first embodiment.

Embodiment 4

Though not shown in the drawings, the resins are not limited to the above-described ones. Any polymeric materials are combined. For example, the resin material 20 for the pre-molding and the resin 2 for insert-molding the pre-molding can be the same resins, the resin 20 being free from fillers.

In the fourth embodiment, the resin 20 for the pre-molding 30 was polybutylene terephthalate resin, which is soluble in the resin, the resin 20 being free from glass fiber. The resin 20 was insert-molded by an injection method. Upon filling of the resin 20, the pre-molding 30 was taken out from the metal mold, after the resin 20 was cooled and solidified.

Then, the pre-molding 30 was insert-molded as an insert with a molten material 2 of polybutylene terephthalate resin containing glass fiber of 40% by weight by an injection method. The composite molding 11 was taken out from the metal mold as same as the pre-molding after the molten resin was cooled and solidified.

Since the resin bands 20b do not contain glass fiber, it is softer than the resin 2; it is possible to fasten the metal terminals 3 together with the resin bands 20b. Further, since the resin bands 20 is mutually soluble with the resin 2, the surface of the resin 20 is covered with the thin film of the resin 2, which leads to the results better than those in the third embodiment.

Embodiment 5

As a fifth embodiment, polyester group elastmer was used as a pre-molding resin 20. As same as in the fourth embodiment, the pre-molding 30 was prepared by an injection molding method, and the pre-molding 30 was insert-molded and a metal mold was filled by an injection molding method with polybutylene terephthalate 2 containing glass fiber of 30% by weight, which is soluble with the polyester group elastmer resin; after the resin was cooled and solidified, a composite molding 11 was separated from the metal mold.

The polyester group elastmer resins 20 have been widely used as sealing materials; portions between the metal terminals 3 and the resin bands 2b can be sealed as a packing member by using these resins.

Because the resin bands 2b shrink as same as in the previous embodiment, it is possible to strongly fasten portions between the metal terminals 3 with the resin bands 20b thereby securing high air-tightness. Further, since the surfaces of the resin bands 20b and resin bands 2b, which are soluble with each other, are integrated with a thin film, the resin layer becomes gap free when polybutylene terephthalate resin 2, which is soluble in the polyester group elastmer is used. Therefore, the adhesion 6 has air-tightness better than that of the first embodiment.

Embodiment 6

Figure 15:
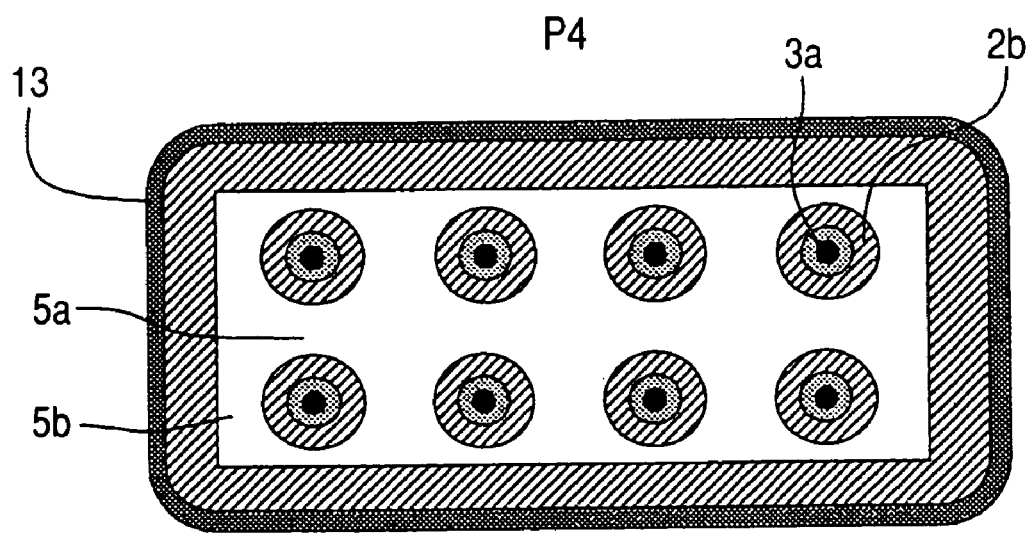
FIG. 15 is a partial frontal cross sectional view of a neighborhood of an insert member in the composite molding according to a forth embodiment of the present invention.
Figure 16:
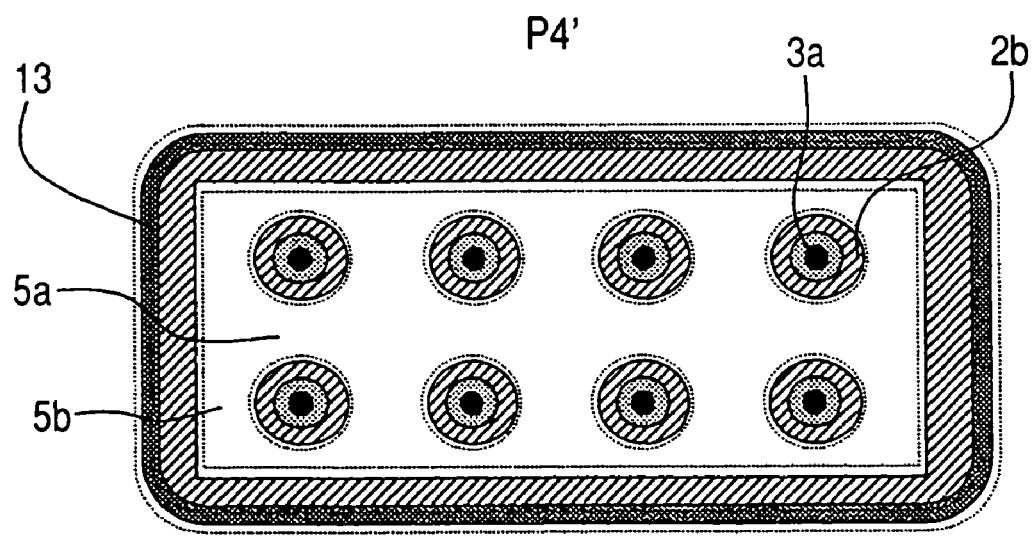
FIG. 16 is a partial frontal cross sectional view of a neighborhood of an insert member in the composite molding of the forth embodiment for showing resin shrinkage at the time of molding in a direction of R in FIG. 22.

As a structure of the metal terminals, a rectangular flat plate has been described; the present invention is not limited to this structure. Any shapes of the metal terminals such as combinations of different structures may be employed. In the sixth embodiment, a structure of the external contact portions 3a of the metal terminals 3 is columnar. FIG. 15 shows a view of the composite molding viewed from the external contact portions 3a side (P4), and FIG. 16 shows shrinkage of the same portions in the direction P4.

As same as in the first embodiment, the metal terminal 3 to be inserted have electrical contact portions 3a for electrical connection with the external electrical connections 3b for circuit boards, etc mounted in the composite molding at a post processing, and portions between the electrical contact portions 3a and 3bt are covered with continuous annular resin 2a for fixing them without gaps. The continuous annular resin bands 2b having a thickness of 1 to 1.5 mm and a height of 3 to 5 mm were formed between the electrical contact portions 3a and the resin 2a. At the same time, gaps 5a having a recess width of 1 to 3 mm and a recess depth of 3 to 8 mm were formed between the adjoining resin bands 2b.

Further, gaps 5b having a recess width of 1 to 3 mm and a recess depth of 3 to 5 mm were formed between bundles of metal terminals 3 each having a resin band 2b and a resin material 2c that surround the bundles. The resin material 2 was polybutylene terephthalate containing glass fiber of 40% by weight.

As for the process for manufacturing the composite molding, the plural metal terminals 3 were inserted into predetermined positions of a metal mold, and resin 2 was filled in the mold by an injection molding method. After the resin was cooled and solidified, the composite molding was separated from the metal mold.

Since the metal terminals have a columnar structure, the resin bands 2b that surround the terminals have a cylindrical form; the cylindrical resin bands 2b can be molded better in balance of shrinking and deforming directions than the resin bands having a rectangular form do. As a result, the continuous annular resin bands 2b and the metal terminals that are contact with the bands could be firmly adhered at the interface thereof without forming gaps to form an adhesion 6.

The columnar metal terminals 3 can be applied to the second embodiments through the sixth embodiment.

Embodiment 7

Figure 22:
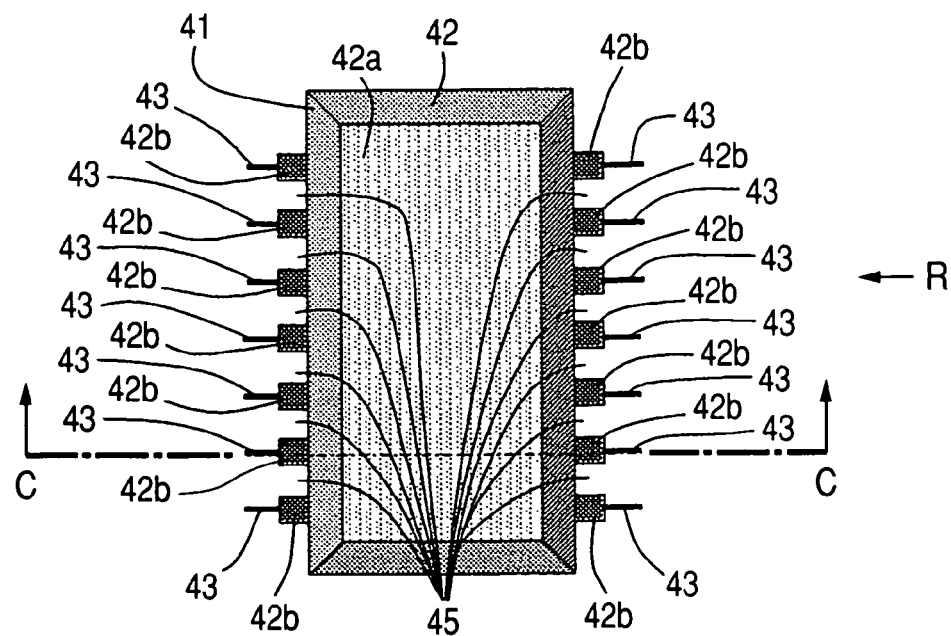
FIG. 22 is a frontal view of a composite molding according to a seventh embodiment of the present invention.
Figure 23:
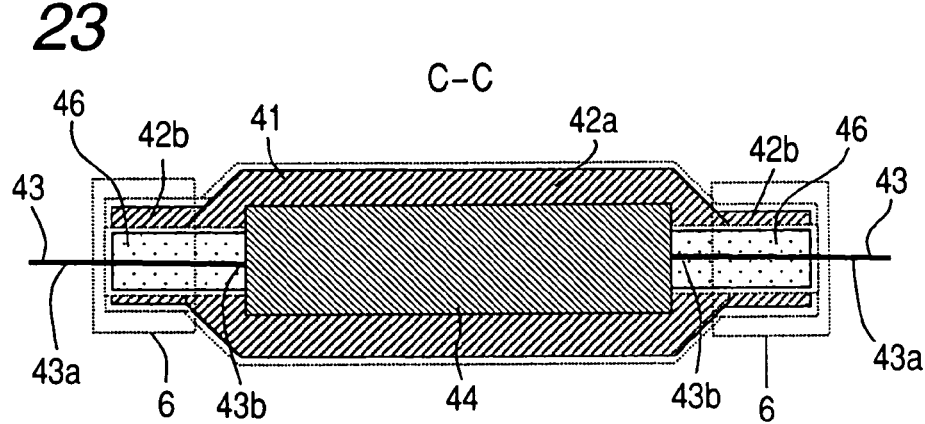
FIG. 23 is across sectional view of the composite molding of the seventh embodiment in a direction C-C in FIG. 22.
Figure 24:
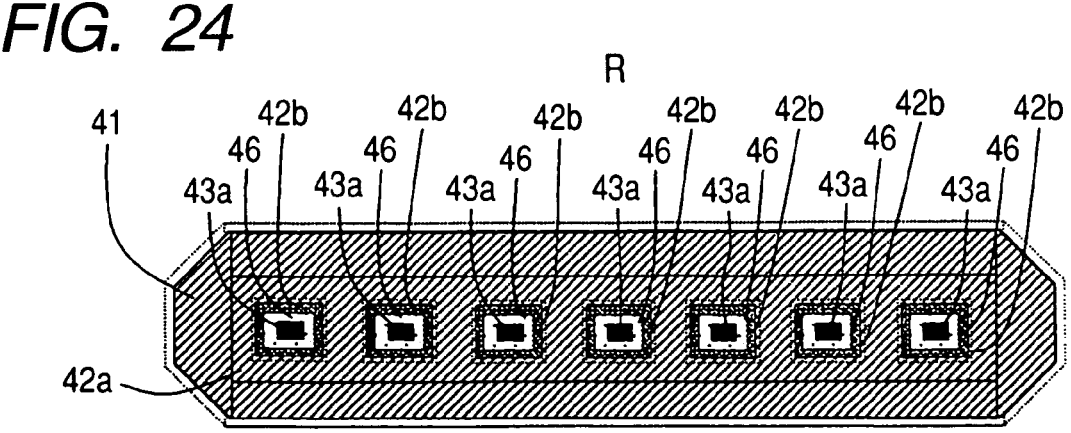
FIG. 24 is a frontal view of the composite molding of the seventh embodiment for showing resin shrinkage at the time of resin molding.

In the above described embodiments concerning the moldings with an inserted member wherein the composite molding has a metal terminal 3 having an electrical contact portion 3a for contacting with an external and an electrical connection 3b for electrical connection with a circuit board, etc, which is mounted in the molding at a post processing, the inserted member can be desired insert members such as ones for semiconductor devices having circuit boards on which electronic elements are mounted. FIG. 22 shows a semiconductor device 41 to which the present invention was applied. FIG. 23 shows a cross sectional view of the semiconductor device 41 and FIG. 24 shows a cross sectional view of the metal terminals 43 view from the side direction.

The metal terminals 43 to be inserted have electrical contact portions 43a for contacting with the external and electrical connections 43b for electrically connecting with a circuit board 44, which is mounted in the molding, whereby the electrical connections 43b of the respective metal terminals 43 and semiconductor devices having a circuit board 44 are bonded to the metal terminals 43. Portions other than the electrical contact portions 43a are covered with resin 42 to thereby constitute a generally known semiconductor device 41.

In this embodiment, resin 46, which is softer than the resin 42, is disposed at part of circumference of the metal terminals 43, which are buried in the resin 42. In more detail, the resin 46 is the continuous annular resin bands 46 that surround the metal terminals 43. The resin bands 46 have a thickness of 0.3 to 0.5 mm and a height of 1 to 1.5 mm. Further, the outer circumference of the resin bands 42b is covered with continuous annular resin bands 42b by insert-molding the insert members having the resin bands 46 thereby to constitute gapless double-layered resin bands. The double-layered resin layers have a width of 0.3 to 0.5 mm and a height of 1 to 1.5 mm. The resin 42 has resin portions for fixedly holding and fixing the resin bands 42b and the circuit board, and there are gaps 45 among the adjoining resin bands 42b.

The resin portions 46 were pre-molded with polyester group elastmer, and the pre-moldings were placed as inserts in predetermined positions of a metal mold heated to a temperature of 120 to 150 degrees Celsius, and the insets were molded by an injection method with polyester group elastmer 42 containing glass fiber of 40% by weight. Semiconductor devices 41 were separated the metal mold after the resin was cooled and solidified.

The polyester group elastmer material 46 has been used widely as a sealing material; the material 46 can seal the metal terminals 43 and the resin bands 42b as a packing material. Since the resin bands 42b shrink, the resin bands 46 are firmly fastened towards the metal terminals 43 thereby to secure high air-tightness.

Further, when a thermoplastic. resin 42 that is soluble in the polyester group elastmer is used, the resin bands 46 and the resin bands 42b are united by a thin film thereby to form resin layers free from gaps. Accordingly, the adhesion 6 has high reliable air-tightness.

Figure 21:
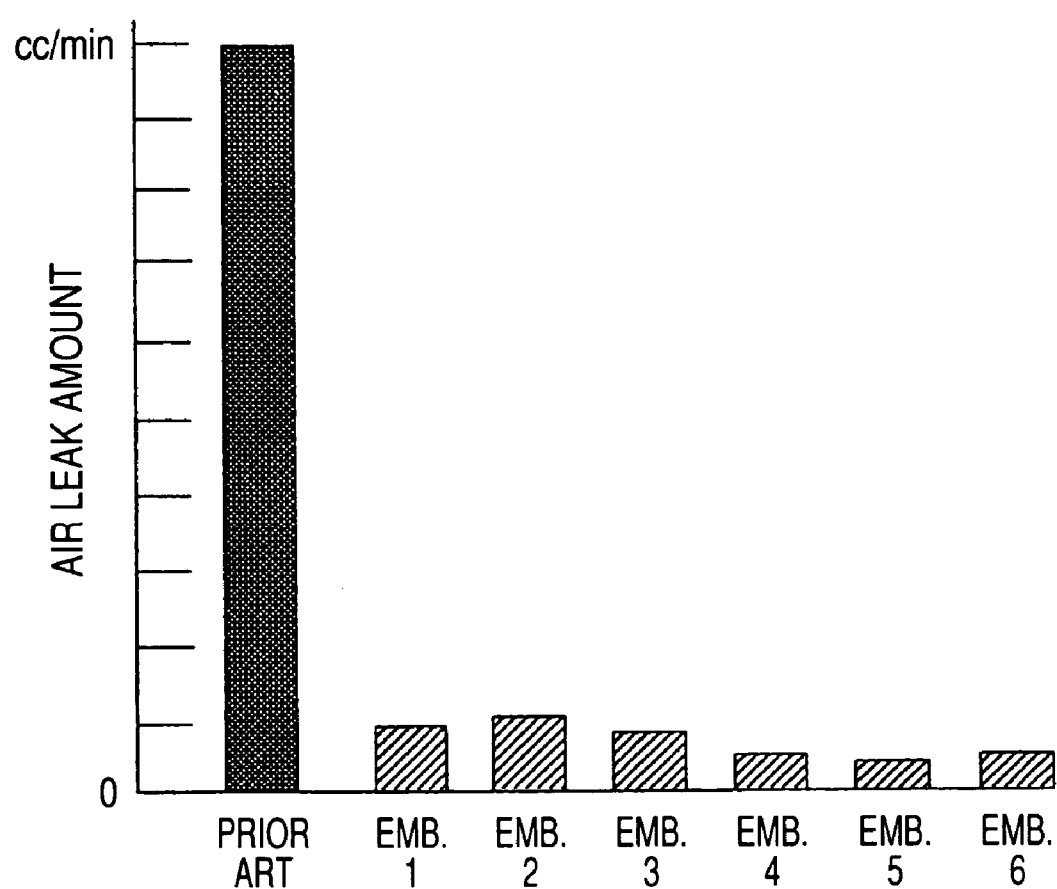
FIG. 21 is a graph showing results of air leak tests with respect to composite moldings of the first embodiment to sixth embodiment.

The composite moldings of the first embodiment to the sixth embodiment produced by the method of the present invention and the conventional composite moldings were subjected to comparison tests with respect to air-tightness under water submerged air leak tests. Measurement of air-leak amount was conducted and the results are shown in FIG. 21. In the water submerged air-leak test method, a waterproof coupler was inserted into one of connectors (metal terminals), which is exposed, and the molding was submerged in water. A certain air pressure was applied to the interior of the coupler. An air amount leaked through the interface between the resin and the metal terminal exposed to the other side in a predetermined time period was measured.

From these results, in the first to third embodiments, compared with the conventional moldings, an air leak amount was reduced to around ¹⁄₁₀. In the fourth to sixth embodiments, the air leak amount was reduced to ¹⁄₂₀ that of the conventional moldings. According to the present invention, it has been confirmed that shrinkage of the resin at the time of molding keeps adhesion at the interface between the metal terminals and the resin without forming partial gaps and the air-tightness between the interior of the composite molding and the exterior.

According to the present invention, it is applied to rotating bodies such as motors or sensors for sensing angles, positions and displacement, using a rotation body. For example, there are throttle valves for controlling an amount of inflow-air of automobiles, throttle position sensors, accelerator opening degree sensors for detecting accelerator opening degree, various sensors for constituting a sensor network, etc. If the problem of the present invention is solved, the above products are not limited.

Since the molding of the present invention is constituted as described above, a local adhesion is formed at the interface between the metal terminals and the resin at the time of shrinkage due to the resin molding. Thus, the following advantages are obtained.

It is possible to easily and precisely arrange the gaps and resin bands at desired positions for increasing adhesion between the terminals and the resin, since the annular resin bands and gaps among the adjoining resin bands can be designed beforehand. Materials for the resin bands, structures and arrangement of the gaps, the number of gaps is not limited; they can be relatively freely designed and arranged.

Materials, structures and sizes for the insert members to be placed in a metal mold and the number of parts are not limited, and hence they can be designed and selected freely. Since the composite moldings can be produced in a single step, the method has high productivity at low cost; the freedom of design is improved.

Further, it is possible to improve productivity and quality without lowering air-tightness in pre-molding in advance for the purposes of improving handling and prevention of deformation of the insert members.

After the insert members are insert-molded, the resin bands with a desired size around the circumference of the insert members and gaps can be easily observed with eyes; reliability of inspection of the moldings before shipment can be carried out.

Since the air-tightness between the insert member and the resin is secured, compared with conventional insert members, it is possible to apply the moldings to the fields of sensors and circuit boards that are used under severe conditions.

Further, control resin molded members can be realized where control circuits or printed circuit boards are disposed on or in the moldings.

INDUSTRIAL APPLICABILITY

According to the present invention, low cost and reliable moldings are realized without increasing the number of steps; thus the present invention is applicable to various industrial products.

The invention claimed is:

1. A group of aligned electrically connecting terminals molded with molding resin extending from the composite molding in one direction; continuous resin bands formed at roots of the connecting terminals, each continuous resin band made of the molded resin and each surrounding a corresponding one of the roots of the connecting terminals;
and a resin member surrounding the group of the connecting terminals, wherein the group of the connecting terminals constitutes a bundle of the connecting terminals, the bundle being surrounded with a gap and united with the molding resin wherein each of the continuous resin bands is surrounded by another gap formed outside of each continuous resin band.

2. A composite molding comprising:
a group of aligned electrically connecting terminals molded with molding resin, the group extending in one direction;
continuous resin bands formed at roots of the connecting terminals, each band being made of the molded resin and surrounding each of the roots of the electrically connecting terminals; and
a resin member surrounding the group of the electrically connecting terminals,
wherein the group of the electrically connecting terminals constitute a bundle, the bundle being surrounded by a gap and united with the molding resin,
each of the resin bands surrounded by another gap formed outside of the continuous resin bands, and
the resin member having an extended portion that extends in the same direction as the electrically connecting terminals and surrounds the gap surrounding the bundle and the bundle.

3. The composite molding according to claim 2, wherein a cross section of the electrically connecting terminals at the continuous resin bands and of the continuous resin bands is rectangular.

4. The composite molding according to claim 2, wherein the extended portion of the resin member extends from the composite molding further than the electrically connecting terminals.

5. A composite molding comprising:
a group of aligned electrically connecting terminals molded with molding resin, the group extending in one direction;
continuous resin bands formed at roots of the electrically connecting terminals, each band surrounding the root of a corresponding electrically connecting terminal; and
a resin member surrounding the group of the electrically connecting terminals,
wherein the group of the electrically connecting terminals are arranged in two lines in a first direction, and are arranged in rows along another direction transverse to the first direction to constitute a bundle of the electrically connecting terminals, the bundle being united with the molding resin and surrounded with a gap,
each of the resin bands is surrounded by another gap formed at the root of the corresponding electrically connecting terminal, and
the resin member having a portion that extends in the same direction as the electrically connecting terminals and that surrounds the gap surrounding the bundle.

6. The composite molding according to claim 5, wherein the extended portion of the resin member extends from the composite molding further than the electrically connecting terminals.

7. A composite molding comprising:
a group of aligned connecting terminals to be connected, the connecting terminals molded with molding resin extending in one direction from the composite molding;
continuous resin bands formed at roots of the connecting terminals, each of the bands surrounding the root of a corresponding connecting terminal; and
a resin member surrounding the group of the connecting terminals, the resin member having an extended portion extending in the same direction as the connecting terminals,
wherein the plurality of the connecting terminals are arranged in two lines in a first direction, and in rows along another direction transverse to the first direction and constitutes a bundle of the connecting terminals, the bundle being surrounded by a gap and united with the molding resin,
each of the resin bands is surrounded by another gap formed at the root of the corresponding connecting terminal, and
the resin member having a portion that extends in the same direction as the connecting terminals and that surrounds the gap surrounding the bundle.

8. The composite molding according to claim 7, wherein the extended portion of the resin member extends from the composite molding beyond the tips of the connecting terminals.

9. A composite molding having a group of aligned connecting terminals, molded with molding resin and extending in one direction from the composite molding;
a continuous resin band at a root of each of the connecting terminals, each continuous resin band surrounding the root of a corresponding one of the connecting terminals, and a resin member surrounding the group of the connecting terminals, the resin member extending in the same one direction as the connecting terminals,
wherein the group of the connecting terminals are arranged in two lines in a first direction and in rows along another direction transverse to the first direction and constitutes a bundle of the connecting terminals, the bundle being united with the molding resin and surrounded by a gap, each of the continuous resin bands surrounded by a gap formed at the root of the corresponding connecting terminal, and the resin member having a portion that extends in the same direction as the connecting terminals and that surrounds the gap that surrounds the bundle, the resin member extending from the composite molding further than the connecting terminals.

* * * * *